United States Patent
Ma et al.

(10) Patent No.: US 7,073,049 B2
(45) Date of Patent: Jul. 4, 2006

(54) NON-COPY SHARED STACK AND REGISTER FILE DEVICE AND DUAL LANGUAGE PROCESSOR STRUCTURE USING THE SAME

(75) Inventors: Ruey-Liang Ma, Hsinchu Hsien (TW); Shih-Wei Peng, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 632 days.

(21) Appl. No.: 10/223,295

(22) Filed: Aug. 20, 2002

(65) Prior Publication Data

US 2003/0200419 A1    Oct. 23, 2003

(30) Foreign Application Priority Data

Apr. 19, 2002   (TW) .............................. 91108156 A

(51) Int. Cl.
    *G06F 9/30*    (2006.01)
(52) U.S. Cl. ...................... 712/209; 712/202
(58) Field of Classification Search ........ 712/208–213, 712/229
    See application file for complete search history.

(56) References Cited

U.S. PATENT DOCUMENTS

| 4,334,269 A | * | 6/1982 | Shibasaki et al. ........... 712/202 |
| 5,638,525 A | * | 6/1997 | Hammond et al. ......... 712/209 |
| 6,088,786 A | * | 7/2000 | Feierbach et al. .......... 712/200 |
| 6,298,434 B1 | * | 10/2001 | Lindwer ...................... 712/209 |
| 2002/0066004 A1 | * | 5/2002 | Nevill et al. ................. 712/209 |
| 2002/0099930 A1 | * | 7/2002 | Sakamoto et al. .......... 712/227 |

OTHER PUBLICATIONS

Hennessey, John L. and Patterson, David A. Computer Architecture—A quantitative Approach. Second Edition. Morgan Kaufmann: 1990. pp. 126-130.*

* cited by examiner

*Primary Examiner*—Eddie Chan
*Assistant Examiner*—Ryan Fiegle
(74) *Attorney, Agent, or Firm*—Bacon & Thomas, PLLC

(57) ABSTRACT

The present invention provides a non-copy shared stack and register set device and a dual language processor structure using the same, which achieve non-copy data sharing by controlling a selector and the stack pointer of a data stack. The selector is connected to each item of the data stack and a register of the register set, such that, when the register set requires to exchange data with the data stack, the selector is controlled and the stack pointer is updated thereby the selector is switched to make the stack item pointed by the stack pointer communicate with the register.

4 Claims, 4 Drawing Sheets

NON-COPY SHARED STACK AND REGISTER FILE DEVICE AND DUAL LANGUAGE PROCESSOR STRUCTURE USING THE SAME

BACKGROUND OF THE INVENTION

1. Field of the Invention

The present invention relates to the technical field of processor, and more particularly, to a non-copy shared stack and register file device and a dual language processor structure using the same.

2. Description of Related Art

With the advance of Internet technology, the cross-platform capability of an application program is getting more and more important. The Java language is known as a cross-platform programming language in wide spread use. However, the Java virtual machine (JVM) is a stack-based system that uses a FILO (First In Last Out) data stack as a storing mechanism. When the JVM system executes an instruction, it automatically fetches one or more operands on the top of the data stack for executing. After completing the execution, the executed result is stored back into the data stack. Therefore, when a register-based processor structure is employed, the executing performance of Java program is not satisfactory.

However, the system software related to the Java applications (such as operation system and JVM) is typically developed by the C language. The C language program and other similar programs are compiled for a register-based processor structure (e.g. the processors of Intel, ARM, and MIPS corporations) to get optimum executing performance.

Therefore, in a software system related to the Java application, it is difficult to obtain an optimum performance either with a single stack-based processor structure or with a single register-based processor structure. Accordingly, the use of Java language is strictly restricted, and thus it is desired for the above conventional skill to be improved so as to mitigate and/or obviate the aforementioned problems.

SUMMARY OF THE INVENTION

An object of the present invention is to provide a non-copy shared stack and register file device such that there is no extra loading for data exchange between register file and data stack, thereby increasing the system performance.

Another object of the present invention is to provide a dual-language processor structure capable of processing the stack-based program and register-based program in a high speed.

A further object of the present invention is to provide dual-language processor structure in which the stack-based processor and register-based processor can share an instruction fetch unit, a memory access unit, an operand access unit, an execution unit and a memory access unit, thereby reducing the hardware cost.

In accordance with one aspect of the present invention, the non-copy shared stack and register file device in accordance with the present invention includes: a register set having a plurality of registers for executing register-based instructions; a data stack having a plurality of stack items and a stack pointer for executing stack-based instructions; a selector connected to each stack item of the data stack and at least one register of the register set for being switched to make at least one stack item communicate with the at least one register; and a control circuit for controlling the selector and updating the stack pointer to switch the selector to make the stack item pointed by the stack pointer communicate with the at least one register.

In accordance with another aspect of the present invention, the dual language processor structure in accordance with the present invention includes: at least one instruction fetching unit for fetching stack-based instructions and register-based instructions; at least one decoding unit for decoding the fetched stack-based instructions and register-based instructions; at least one operand access unit for accessing operands corresponding to the fetched stack-based instructions and register-based instructions, the operand access unit having a register set, a data stack and a selector, the register set having a plurality of registers, the data stack having a plurality of stack items and a stack pointer, the selector being connected to each stack item of the data stack and at least one register of the register set for being switched to make a stack item pointed by the stack pointer communicate with the at least one register; at least one execution unit for performing operations corresponding to operators decoded by the decoding unit and the operands accessed by the operand access unit; and at least one memory access unit for accessing executing result from the execution unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
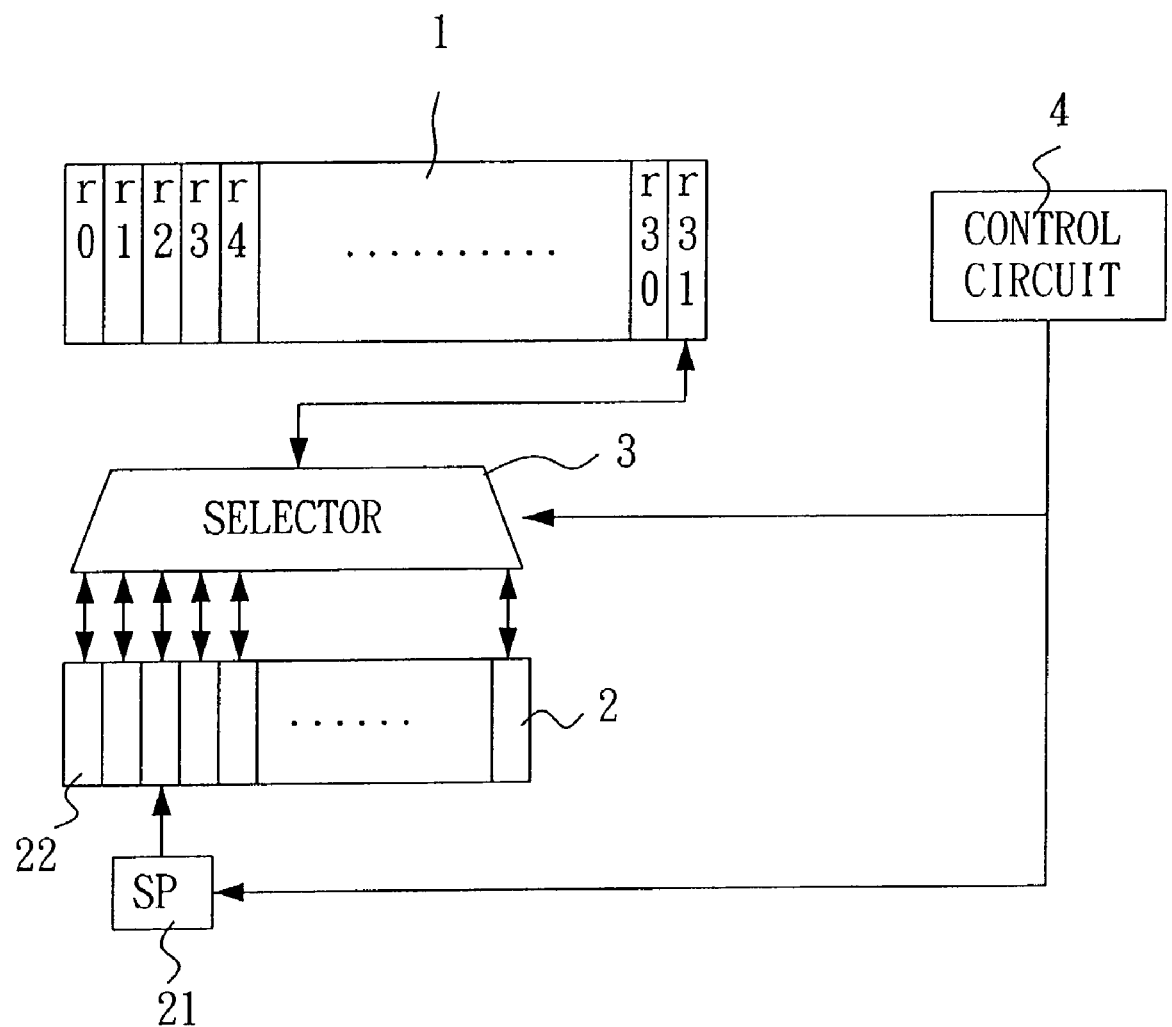
FIG. 1 is a schematic view of the non-copy shared stack and register file device in accordance with the present invention.

With reference to FIG. 1, there is shown a non-copy shared stack and register file device in accordance with the present invention, which includes a register set 1, a data stack 2, a selector 3, and a control circuit 4. The register set 1 has a plurality of registers. In this preferred embodiment, there are thirty-two registers, denoted as r0~r31. These registers are provided for executing the register-based instructions, such as the instructions written by the programming language of C, Pascal, and the like. The data stack 2 has a stack pointer 21 and a plurality of stack items 22, for example sixteen stack items 22, for executing the stack-based instructions, such as the instructions written by Java language. When executing the stack-based instruction, the stack pointer 21 points to the top of the data stack 2 for fetching one or more operands to perform the required operation, and the result is placed back to the data stack 2 after the operation is completed.

The selector 3 is provided to select at least one stack item 22 from the data stack 2 for communicating with a corresponding register. In this preferred embodiment, the selector 3 is a 16-to-1 multiplexer having sixteen selecting terminals connected to the sixteen stack items 22 of the data stack 2, respectively, and one communicating terminal connected to the last register r31 of the register set 1.

Under the control of the control circuit 4, when executing the stack-based instruction, the stack pointer 21 is updated to access the data in the data stack 2, and the selector 3 makes the stack item 2 pointed by the stack pointer 21 communicate with the register r31, thereby switching the data read and input of the register set 1 and data stack 2.

With the above non-copy shared stack and register file device, when executing the object code of C or Pascal program, each data unit can be arbitrarily stored in or read from any register of the register set 1. When executing the object code of the Java program or the like, the control circuit 4 detects whether the last register r31 of the register set 2 is read or written. If the last register r31 is read, the stack pointer 21 is decremented, and if the last register r31 is written, the stack pointer 21 is incremented. Furthermore, the control circuit 4 controls the selector 3 to make the last register r31 capable of directly reading data from or writing data into the stack item 22 on top of the data stack 2. Therefore, no extra time is required for copying data from the data stack 2 to the register set 1, or copying data from the register set 1 to the data stack 2. Accordingly, there is no extra burden for switching data between the register set 1 and data stack 2, thereby greatly increasing the system performance.

Figure 2:
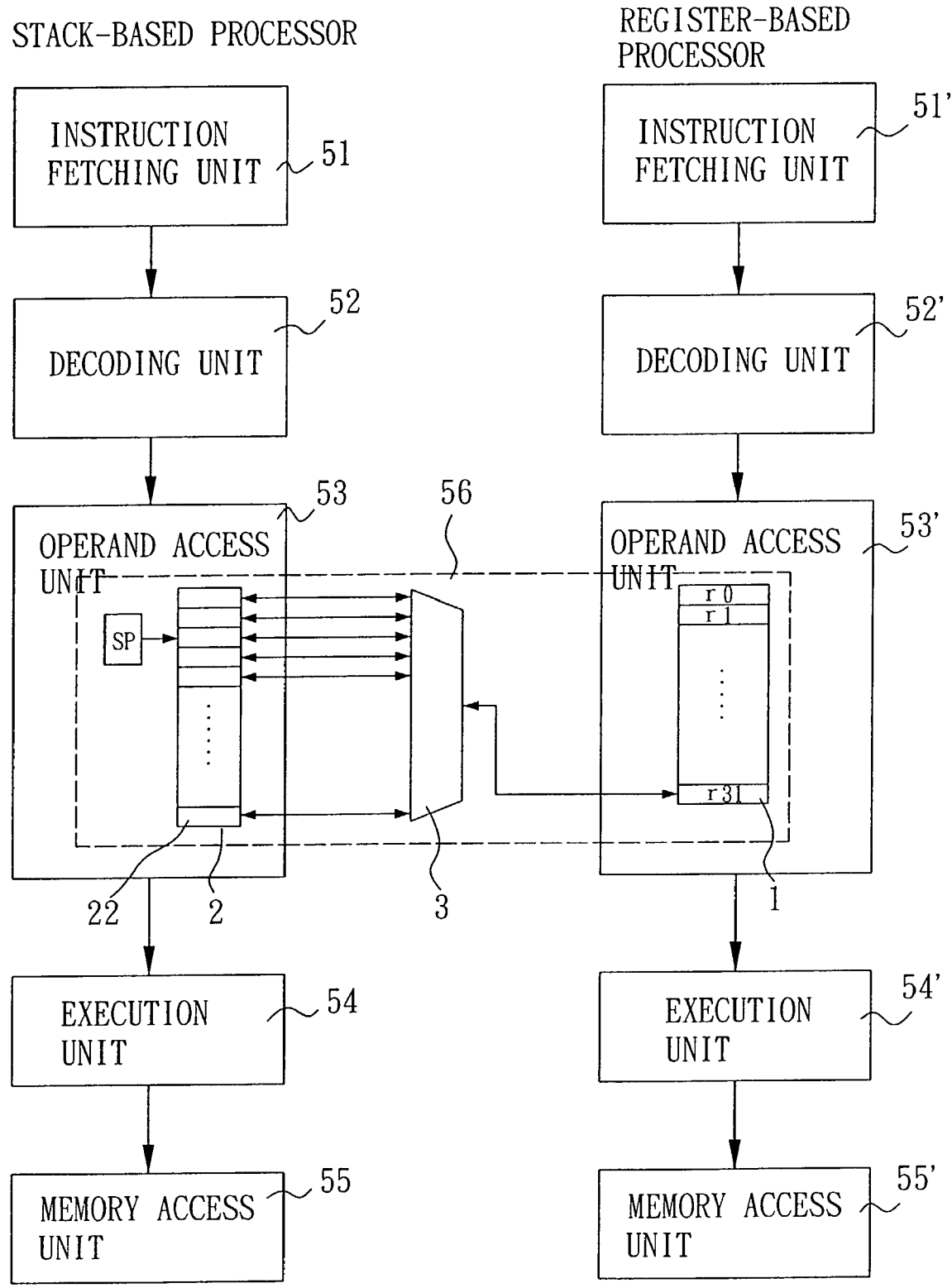
FIG. 2 is a schematic view of a dual language processor structure using the non-copy shared stack and register file device in accordance with a first embodiment of the present invention.

FIG. 2 is a schematic view of a dual language processor structure using the non-copy shared stack and register file device, wherein each of the stack-based processor and register-based processor has respective instruction fetching unit 51, 51', decoding unit 52, 52', operand access unit 53, 53', execution unit 54, 54', and memory access unit 55, 55'. The non-copy shared stack and register file device 56 is provided for data exchange between the operand access units 53 and 53', wherein the operand access unit 53 uses the data stack 2 to access operands, and the operand access unit 53' uses the register set 1 to access operands The instruction fetching units 51 and 51' are provided to fetch the stack-based instructions (e.g. Java program) and register-based instructions (e.g. Pascal program). The decoding units 52 and 52' are provided to decode the fetched stack-based instructions and register-based instructions. After decoding, the operand access units 53 and 53' access the operands based on the decoding result. The non-copy shared stack and register file device 56 is arranged between the operand access units 53 and 53', and provides a selector 3 connected to each stack item 22 of the data stack 2 in the operand access unit 53 and also connected to the last register r31 of the register set 1 in the operand access unit 53'. Therefore, the stack item 22 pointed by the stack pointer 21 can be switched to communicate with the register r31, thereby achieving the purpose of sharing data.

The execution unit 54 and 54' perform operations corresponding to the operators decoded by the decoding units 52 and 52' and the operands accessed by the operand access units 53 and 53'. The executing result can be accessed by the memory access unit 55 and 55'.

Figure 3:
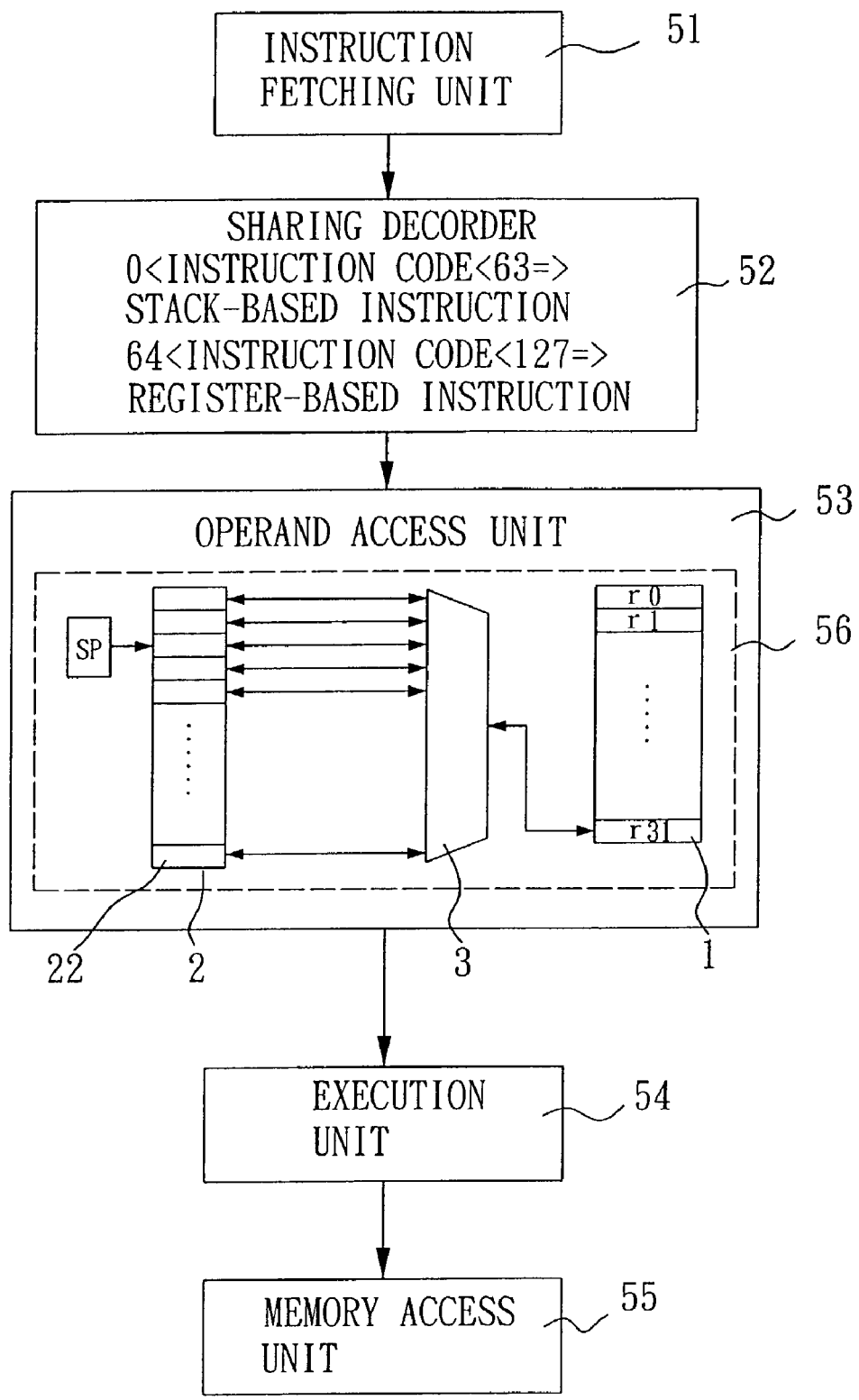
FIG. 3 is a schematic view of a dual language processor structure using the non-copy shared stack and register file device in accordance with a second embodiment of the present invention.

FIG. 3 shows a second embodiment of the dual language processor structure in accordance with the present invention. In this embodiment, the stack-based processor and the register-based processor share an instruction fetching unit 51, a decoding unit 52, an operand access unit 53, an execution unit 54, and a memory access unit 55. The decoding unit 52 is a sharing decoder capable of identifying the stack-based instructions and register-based instructions by encoding these two types of instructions differently. That is, the stack-based instructions and register-based instructions are in the same instruction set, and the decoding unit 52 identifies the stack-based instructions and register-based instructions according to the sequence of the instruction set to perform a decoding. For example, the X stack-based instructions are encoded to number 0 to X−1, and the Y register-based instructions are encoded to number X to X+Y−1. The other units of this embodiment are similar to those of the previous embodiment, and thus a detailed description is deemed unnecessary.

Figure 4:
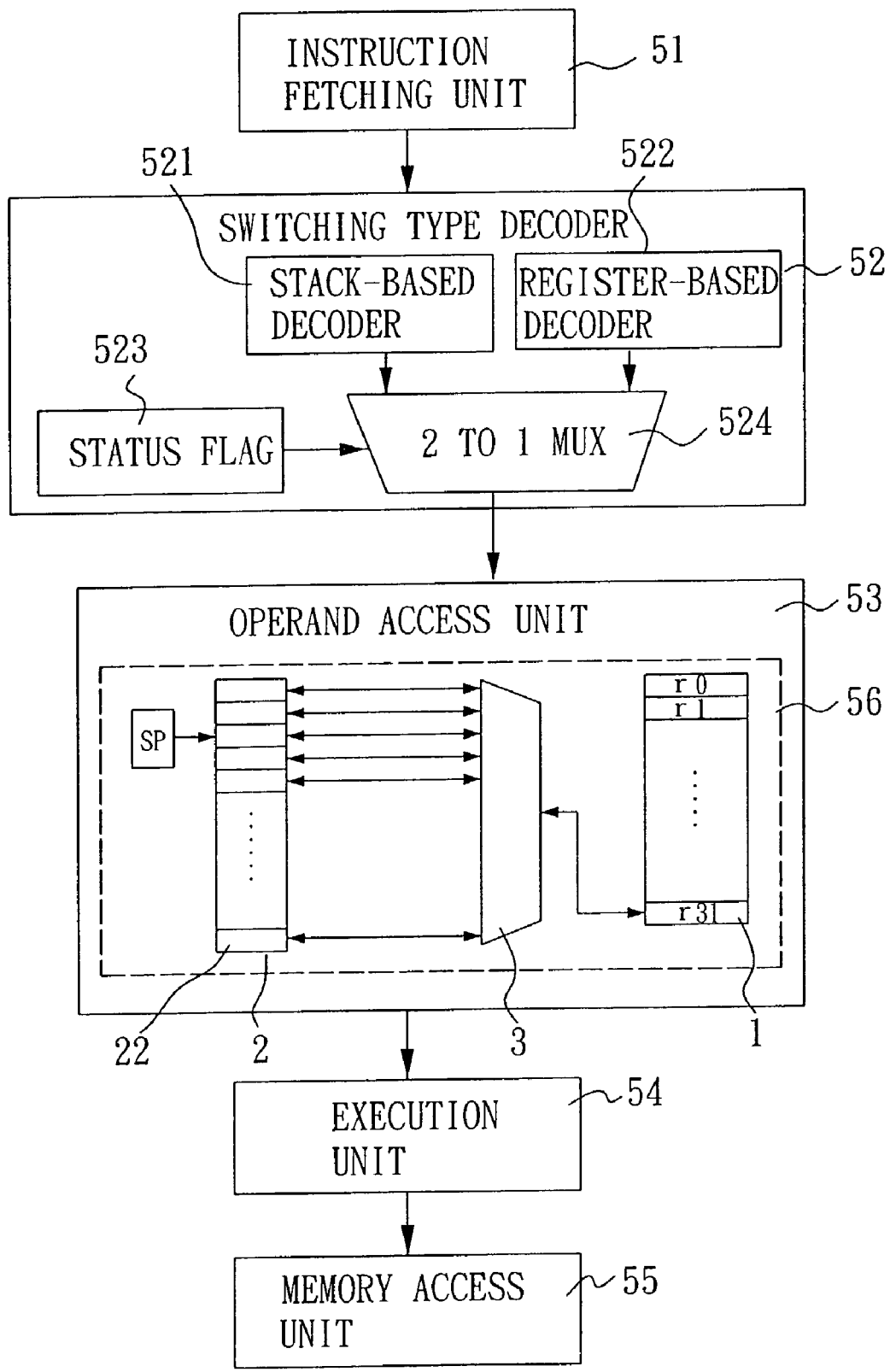
FIG. 4 is a schematic view of a dual language processor structure using the non-copy shared stack and register file device in accordance with a third embodiment of the present invention.

FIG. 4 shows a third embodiment of the dual language processor structure in accordance with the present invention. In this embodiment, the stack-based processor and the register-based processor also share an instruction fetching unit 51, a decoding unit 52, an operand access unit 53, an execution unit 54, and a memory access unit 55. The decoding unit 52 is a switching type decoder having a stack-based instruction decoder 521 and a register-based instruction decoder 522. One of the two decoders is selected based on the status of a status flag 523 for decoding the stack-based instruction or register-based instruction. For example, when the status flag 523 is 0, the stack-based instruction decoder 521 is selected to perform decoding, and when the status flag 523 is 1, the register-based instruction decoder 522 is selected to perform decoding. The decoding result is outputted through a 2-to-1 multiplexer 524. The other units of this embodiment are similar to those of the first embodiment, and thus a detailed description is deemed unnecessary.

In view of the foregoing, it is known that, in the present invention, the object codes of the stack-based program and register-based program are executed by a stack-based mechanism and a register-based mechanism, respectively, and a non-copy shared stack and register file device is used to perform the data exchange between the data stack and the register set, thereby realizing a high-efficient dual language processor structure. Furthermore, in the dual language processor structure, the stack-based processor and the register-based processor can share the same instruction fetching unit, decoding unit, operand access unit, execution unit, and memory access unit, thereby decreasing the hardware cost.

Although the present invention has been explained in relation to its preferred embodiment, it is to be understood that many other possible modifications and variations can be made without departing from the spirit and scope of the invention as hereinafter claimed.

What is claimed is:

1. A dual language processor structure comprising:
   at least one instruction fetching unit for fetching stack-based instructions from stack-based programs and register-based instructions from register-based programs;
   at least one decoding unit for decoding the fetched stack-based instructions and register-based instructions, wherein the at least one decoding unit is a switching type decoder having a stack-based instruction decoder and a register-based instruction decoder, and one of the two decoders is selected based on status of a status flag for decoding the respective stack-based instructions or register-based instructions;
   at least one operand access unit for accessing operands corresponding to the fetched stack-based instructions and register-based instructions, the operand access unit having a register set, a data stack and a selector, the register set having a plurality of registers, the data stack having a plurality of stack items and a stack pointer, the selector being connected to each stack item of the data stack and at least one register of the register set for being switched to make a stack item pointed by the stack pointer communicate with the at least one register;

at least one execution unit for performing operations corresponding to operators decoded by the decoding unit and the operands accessed by the operand access unit; and at least one memory access unit for accessing executing result from the execution unit.

2. The dual language processor structure as claimed in claim 1, wherein the at least one operand access unit updates the stack pointer and switches the selector to make the stack item pointed by the stack pointer communicate with the at least one register when the at least one register is read, thereby reading out data from the stack item pointed by the stack pointer.

3. The dual language processor structure as claimed in claim 1, wherein the at least one operand access unit updates the stack pointer and switches the selector to make the stack item pointed by the stack pointer communicate with the at least one register when the at least one register is written, thereby writing data into the stack item pointed by the stack pointer.

4. The dual language processor structure as claimed in claim 1, wherein the selector is a multiplexer.

* * * * *